US008638202B2

(12) United States Patent
Oesterling

(10) Patent No.: US 8,638,202 B2
(45) Date of Patent: Jan. 28, 2014

(54) KEYFOB PROXIMITY THEFT NOTIFICATION

(75) Inventor: Christopher L. Oesterling, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 99 days.

(21) Appl. No.: 13/445,553

(22) Filed: Apr. 12, 2012

(65) Prior Publication Data

US 2013/0271273 A1 Oct. 17, 2013

(51) Int. Cl.
*B60R 25/10* (2013.01)
*G05B 19/00* (2006.01)

(52) U.S. Cl.
USPC ............ 340/426.18; 340/426.35; 340/426.36; 340/5.61; 340/5.64; 340/10.1; 307/9.1; 307/10.3

(58) Field of Classification Search
USPC ........................... 340/426.18, 426.35, 426.36
See application file for complete search history.

(56) References Cited

U.S. PATENT DOCUMENTS

| | | | | |
|---|---|---|---|---|
| 5,937,065 | A * | 8/1999 | Simon et al. | 380/262 |
| 2008/0055040 | A1 * | 3/2008 | Lizza et al. | 340/5.7 |
| 2008/0061929 | A1 * | 3/2008 | Cromer et al. | 340/5.61 |

* cited by examiner

*Primary Examiner* — Donnie Crosland
(74) *Attorney, Agent, or Firm* — Anthony Luke Simon; Reising Ethington P.C.

(57) ABSTRACT

A method of providing a notification following a passive, keyless start of a vehicle when a keyfob for the vehicle is not within a passenger compartment of the vehicle. Where a motor is started using a passive keyless start (PKS) system having a keyfob transceiver within the keyfob and a vehicle transceiver (VT) within the vehicle, the absence of the keyfob may be determined by the failure to receive an accurate response signal from the keyfob transceiver following the transmission of a vehicle challenge signal from the vehicle transceiver. Upon this determination, a notification may be provided directly or indirectly to the vehicle user via a wireless carrier system.

17 Claims, 3 Drawing Sheets

KEYFOB PROXIMITY THEFT NOTIFICATION

TECHNICAL FIELD

The present invention relates generally to automobile key systems and more particularly to passive keyless entry and start systems.

BACKGROUND OF THE INVENTION

There are at least four denominations of key systems in the automotive industry: (a) a physical key which requires the physical key for entry and to start the engine; (b) a physical key with an RFID (Radio Frequency Identification) immobilizer which requires the physical key for entry and the physical key plus RFID to start the engine; (c) a keyless entry with an RFID immobilizer which may permit remote active entry [e.g., pressing a button(s) on the vehicle door] and requires the physical key plus RFID to start the engine; and (d) a passive keyless entry and start (PKES) which may permit remote passive entry and start [e.g., entry and start automated; pressing of button(s) may not be required to enter or start the vehicle].

PKES systems may be prone to relay attacks. Under normal operating conditions, PKES systems may automatically unlock and start the vehicle when the vehicle user (often carrying a vehicle keyfob) is within a prescribed proximity of the vehicle. In relay attacks, the vehicle may be unlocked and started when the vehicle user is not within the appropriate proximity of the vehicle. The use of relay signals trick the vehicle into concluding that the vehicle user is within the prescribed proximity and thus performs the automated unlock and start functionality. Therefore, thieves may gain entry to the vehicle. FIG. 1 illustrates one example of a relay attack. FIG. 1 shows a vehicle 1 equipped with a PKES system having a vehicle receiver/transmitter 2; a vehicle keyfob 3 being carried by the vehicle's owner or other authorized user 4; and a first and second thief 5,6. The first thief 5 may place a fixed repeater (FR) 7 near the target vehicle 1 and the second thief 6 may carry a mobile repeater (MR) 8. The repeater is a device which may receive and retransmit the signal (i.e., relay the signal). It may contain a processor and a modem; thus, the received signal may be modulated prior to being retransmitted (e.g., to a different frequency, encoded, etc.). In addition, the repeaters 7, 8 may communicate wirelessly or by wire. In any case, the first thief 5 first acquires an interrogation signal from the vehicle 1. This may be accomplished by merely placing the FR 7 near the vehicle 1 in systems that periodically or continuously transmit an interrogation signal via the vehicle receiver/transmitter 2. In some systems, the interrogation signal is emitted by the receiver/transmitter 2 once the vehicle door handle is lifted. Upon acquisition of the interrogation signal, the FR 7 sends the signal to the MR 8. Provided the second thief 6 is close enough to the victim 4, the keyfob 3 will respond to the interrogation signal sent from the MR 8—being tricked into believing that the vehicle 1 must be nearby. The keyfob 3 sends a reply signal which is in turn captured by the MR 8 and relayed to the FR 7, which in turn relays it to the vehicle 1 where it is received by the receiver/transmitter 2. The receiver/transmitter 2 then validates the signal and unlocks the vehicle doors. For some keyless systems, a similar process may be performed in order to start the vehicle 1. In some instances, the vehicle doors must first be closed before the vehicle 1 will send an interrogation signal via the receiver/transmitter 2; in some systems, a start button inside the vehicle 1 must be actuated first. Furthermore, in some PKES systems, there are multiple transmissions between the receiver/transmitter 2 and the keyfob 3 prior to unlocking the vehicle doors or starting the vehicle 1 (e.g., first a wake-up signal from the receiver/transmitter 2 and an acknowledgement signal from the keyfob 3; then an interrogation signal from the receiver/transmitter 2 and then a reply signal from the keyfob 3). Also, while there is generally only one FR 7 required, thieves may use multiple MRs 8. The MR(s) 8 may be strategically positioned rather than carried by the thief 6 (e.g., near one or more entrances or hallways where the victim 4 is likely to walk after exiting the vehicle 1). In wireless repeater systems, the range of reception/transmission may vary depending upon such factors as design and environment. Regardless, the MR 8 typically does not need to be extremely close to the victim's keyfob 3 (e.g., 10-15 meters away) making the relay attacked all the more covert.

A PKES system is one type of a passive keyless (PK) system in which a keyfob, as defined herein, is used to passively authorize a user, carry out a vehicle function (e.g., door unlock), or both. As used herein, PK systems include passive keyless entry and start (PKES) systems, passive keyless entry (PKE) systems (without passive start), as well as passive keyless start (PKS) systems that may not provide for passive entry. Thus, it will also be appreciated that a PK system may include use of a key or require other user action for either entry or vehicle start (ignition-on).

SUMMARY OF THE INVENTION

According to an aspect of the invention, there is provided a method of providing a notification for a vehicle having a passive keyless (PK) system that includes a vehicle transceiver (VT) carried by the vehicle and a portable keyfob. The steps of the method may include: sending a vehicle challenge signal from the VT; receiving from the keyfob a valid first response to the vehicle challenge signal; carrying out a vehicle function in response to a command received from the PK system following receipt of the valid first response signal; determining an absence of the keyfob within a vehicle passenger compartment of the vehicle after the vehicle is started; and providing a notification in response to the determination of the keyfob's absence.

According to another aspect of the invention, there is provided a method of providing a notification following a passive, keyless start of a vehicle when a keyfob for the vehicle is not within a passenger compartment of the vehicle. The steps of the method may include: starting a motor of a vehicle using a passive keyless start (PKS) system; determining an absence of the keyfob within a vehicle passenger compartment after the motor is started; and providing a notification in response to the determination of the keyfob's absence from the vehicle via a wireless carrier system using a vehicle telematics unit carried by the vehicle.

According to another aspect of the invention, there is provided a system of vehicle theft notification. The system may include: a passive keyless start (PKS) system of a vehicle; at least one vehicle system module (VSM) able to detect a vehicle sensor input associated with vehicle movement; and a vehicle telematics unit (VTU) carried by the vehicle able to wirelessly transmit a notification of the absence of the keyfob from within the vehicle when after the passive keyless start vehicle movement has been detected and there is a failure to validate the presence of the keyfob within the passenger compartment within a selected amount of time. The PKS system may include a vehicle transceiver (VT) and a vehicle keyfob having a keyfob transceiver (KT). The VT and the KT may be capable of wirelessly communicating with each other to passively start the vehicle, and the transceivers may be capable of wirelessly communicating at least once after the vehicle is started to validate the presence of the keyfob within a passenger compartment of the vehicle.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The method described below pertains to notifying vehicle users having vehicles equipped with passive keyless (PK) systems when the user's vehicle is moving without the keyfob within the vehicle. The absence of the keyfob may indicate a theft of the vehicle or it may merely indicate that the vehicle has autostarted using the PK system and the vehicle user has somehow left his keyfob outside the vehicle. When a keyfob is left outside the vehicle, it may be either carried by the vehicle (e.g., on the roof or bumper of a vehicle or in the bed of a pickup truck) or be left at a location distant from the vehicle. Upon either occurrence, the method herein described may provide a notification to the vehicle user and/or to emergency services such as law enforcement.

Communications System

Figure 1:
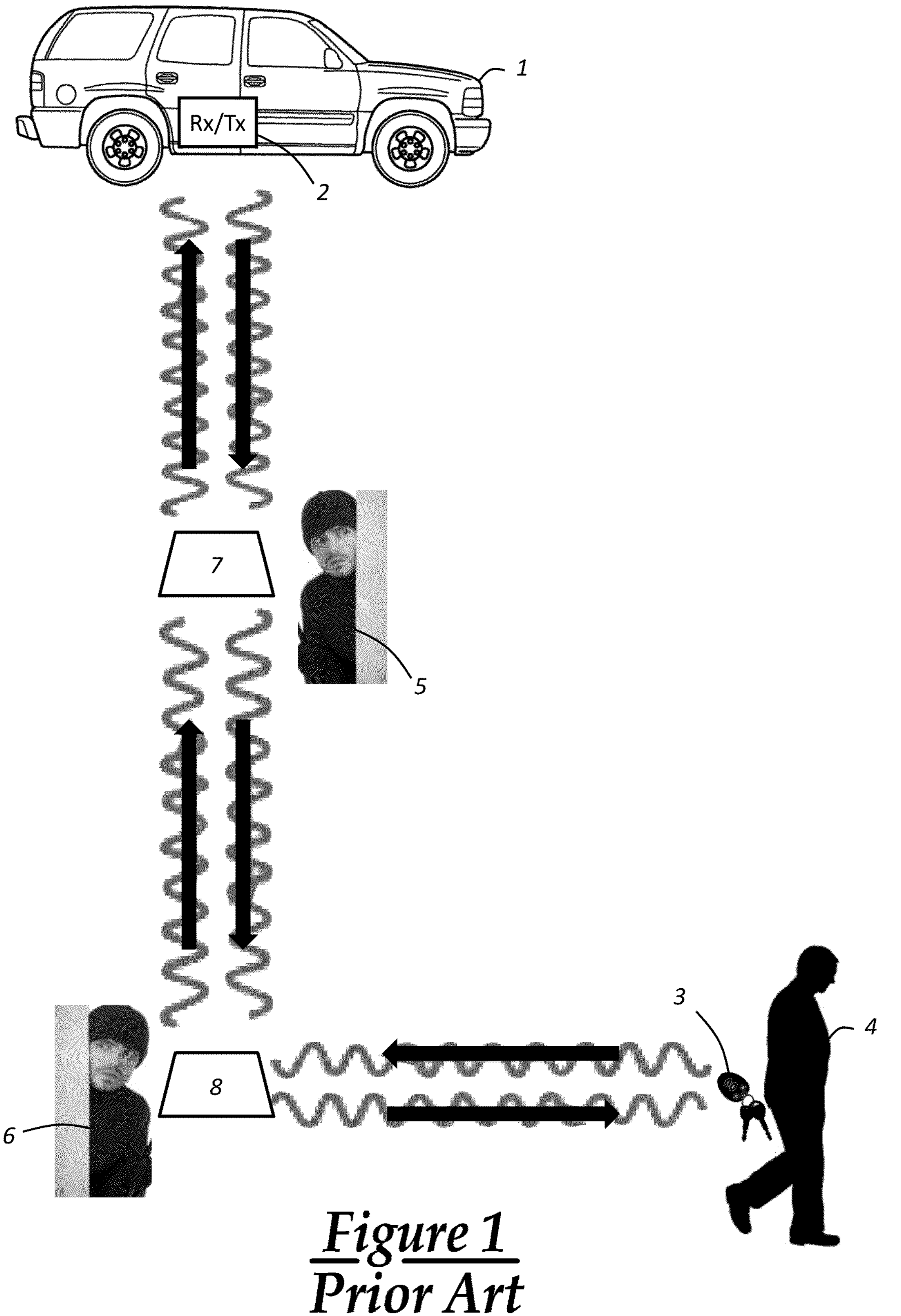
Figure 1 Prior Art
FIG. 1 is a block diagram of a relay attack on a vehicle equipped with a passive keyless entry and start system.
Figure 2:
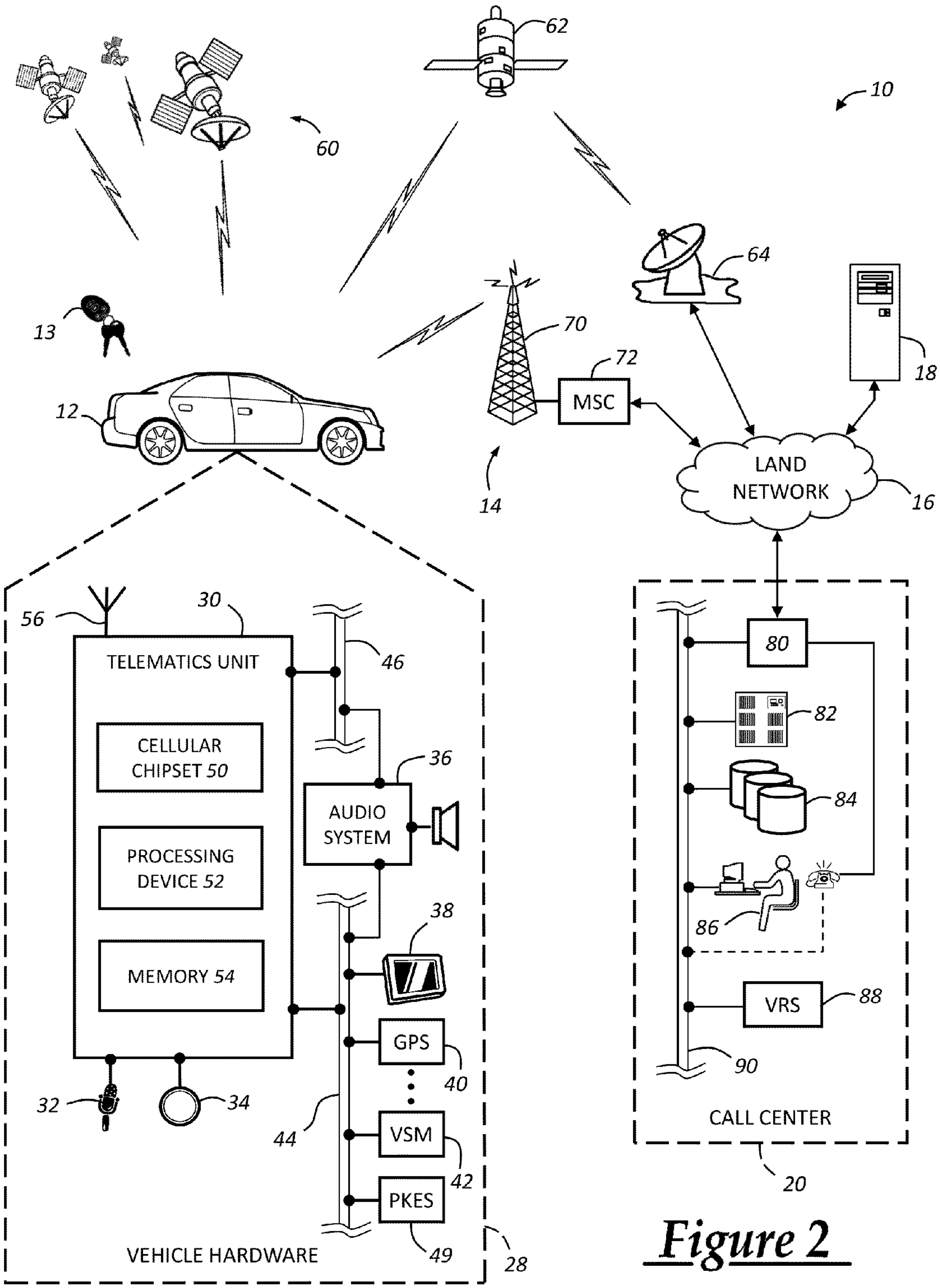
FIG. 2 is a block diagram depicting an exemplary embodiment of a communications system that is capable of utilizing the method disclosed herein.

With reference to FIG. 2, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. The vehicle 12 includes an electronic vehicle key or keyfob 13 and may include pushbutton keyless-start technology (e.g., rather than requiring insertion of the key into a switch). In the illustrated embodiment, keyfob 13 includes a remote transmitter which communicates with a base unit installed in the vehicle 12 to provide the vehicle operator with localized wireless access to various vehicle functions such as locking and unlocking doors, arming and disarming of a vehicle alarm system, trunk release, and panic signaling. The keyfob may include buttons for these various features so that, for example, by depressing the panic button on the keyfob, the transmitter signals the vehicle to sound a high decibel alarm that can be heard for some distance. As used herein, the term "keyfob" refers to any portable vehicle access device that enables access to the vehicle interior, vehicle engine operation, or both. The term "keyfob" includes both passive and active transmitters that can be attached to a key or set of keys by a loop or tether, as well as other portable remote transmitters regardless of whether they are attached to keys, as well as remote transmitters that are integrated together with a vehicle key or other device as a single component. The keyfob and its associated base unit on the vehicle may be conventional components that are well known to those skilled in the art.

In addition to the keyfob 13, some of the other vehicle electronics 28 is shown generally in FIG. 2 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30. The GPS module 40 may also be used to determine vehicle movement, speed, and/or velocity. Speed and velocity are merely functions of changes in distance versus changes in time (whereas velocity further indicates direction).

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module (PCM) that regulates operation of one or more components of the vehicle powertrain and determines whether they are currently operative (e.g., determines ON or OFF state), and another VSM 42 can be a body control module (BCM) that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

According to one embodiment, the BCM and/or other VSMs 42 may detect one or more vehicle entrance indicators. Vehicle entrance indicators may include vehicle sensor inputs of any activity by a vehicle user indicative of vehicle ingress such as the actuation of a door handle, whether a vehicle door is open or closed, whether a seat buckle or passenger restraint is fastened or secured, the depression of a brake pedal and/or of a clutch pedal, the actuation of a vehicle start button, and/or the engagement of a transmission (e.g., placing the vehicle 12 in DRIVE or REVERSE). In addition, the vehicle 12 may be equipped with keyfob locators inside of and/or outside of the passenger compartment that detect the presence of the vehicle key or the keyfob used to start the vehicle. At least one keyfob locator may be located in the passenger compartment near the driver. Other keyfob locators may be near the vehicle doors or the rear of the vehicle (e.g., near the trunk) to detect the presence of the key or keyfob as it approaches the vehicle. In all cases, the keyfob locators may be hidden from view (e.g., underneath paneling or the vehicle's body panels). This list is merely exemplary and not exclusive of all vehicle entrance indicators. The BCM or other VSM may determine vehicle ingress using one or more of these vehicle entrance indicators (e.g., using a combination, series, or sequence of vehicle entrance indicators).

The BCM may also determine vehicle movement using one or more sensor inputs. These sensor inputs may include one or more position sensors at one or more wheels of the vehicle 12

(such as encoders, Hall-effect sensors, etc.). The sensor inputs to the BCM may also include vehicle accelerometer or gyroscopic data.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. One such pushbutton 34 may be a vehicle start button which may initiate a vehicle ignition sequence (e.g., internal combustion engines) or a vehicle start sequence (e.g., electric vehicles). Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 2 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 2. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like.

Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 3:
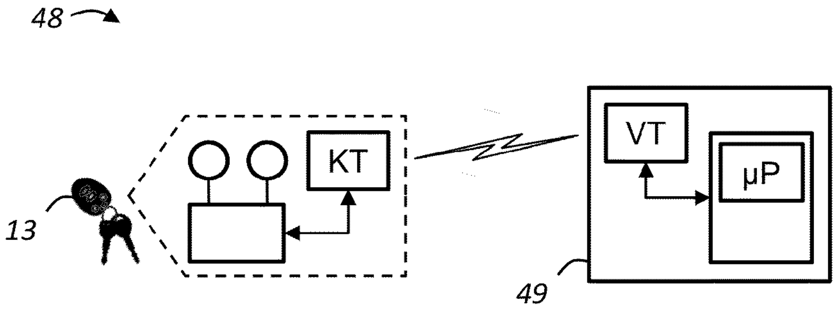
FIG. 3 is a block diagram of a passive keyless (PK) system that is included as part of onboard vehicle electronics shown in FIG. 2.

With reference also to FIG. 3, the vehicle 12 may be equipped with a passive keyless (PK) system which in the illustrated embodiment is shown as a passive keyless entry and start (PKES) system 48. The PKES system may include keyfob 13 and an onboard (vehicle-installed) VSM 49 that includes a vehicle transceiver (VT), a processor, and associated electronics, as indicated. Vehicles having PKES may automatically unlock and start the vehicle 12 based upon communications between the VT and the keyfob. The VT may transmit and receive signals to/from the keyfob and may transmit in the low frequency (e.g., 120-135 kHz with a range of up to approximately 100 meters). The processor may execute instructions that provide at least some of the functionality for the keyfob. As used herein, the term instructions may include, for example, control logic, computer software and/or firmware, programmable instructions, or other suitable instructions. The processor may include, for example, one or more microprocessors, microcontrollers, application specific integrated circuits, programmable logic devices, and/or any other suitable type of processing device. In another embodiment, the processor may be in the vehicle telematics unit 30 or the telematics unit 30 itself. The keyfob 13 may comprise a radio frequency identification (RFID) tag, an ultra-high frequency keyfob transceiver (KT), and a user interface (e.g., pushbuttons). The RFID tag may be in the low frequency (e.g., 120-135 kHz) for shorter range communication (the tag may be excited at a range of 1-2 meters in an active mode or at a range of 2-5 centimeters in a passive mode). Active mode refers to the RFID tag being coupled to a power source (e.g., a battery in the keyfob) so that the RFID signal may be transmitted at any time. In contrast, RFID tags in the passive mode utilize no power source, and therefore are only responsive when excited by another power source—e.g., by induction. Often the other source may be the source attempting to read their RFID tag. The ultra-high frequency KT may operate in the 315 or 433 MHz frequencies with a range of approximately 10-100 meters, thus enabling longer range communication. The user interface may include buttons for remote lock/unlock of the vehicle doors, remote trunk open, and a panic button. Furthermore, the keyfob may also comprise a processor. In vehicles having keyfob locators, the locators may transmit a low frequency signal that is identifiable by the keyfob's low frequency RFID tag in the active mode. Thus, the keyfob locators may indicate when the keyfob is within 1-2 meters of one of these locations—and thereby may determine whether the keyfob is inside of or outside of the vehicle 12.

In some PKES systems 48, the system will unlock the vehicle door(s) when the keyfob 13 (e.g., carried by the vehicle user) merely enters a proximity of the vehicle 12. Starting of the vehicle in such systems may require a further user action, such as pressing a start button in the vehicle and providing a start command. This further user action may also involve a further confirmation of the continued presence of the keyfob. In other embodiments, the PKES system may both unlock and start the car automatically. Thus, the user may simply open the door and drive the vehicle because of his or her mere possession of the keyfob (i.e., without ever inserting the keyfob in a lock or switch and/or without depressing the vehicle start button). In either approach, the vehicle is unlocked and started after a wireless communication occurs between the VT and the KT which may be transparent to the vehicle user. For example, the VT may transmit a continuous or periodic beacon signal. The beacon signal may comprise a challenge or a query to validate the keyfob's identity. The beacon signal may further comprise a vehicle identification (ID). When the keyfob 13 is in proximity of the beacon signal, the processor may wake-up, demodulate the challenge signal, interpret it, and compute a response signal which may then be transmitted via the KT. Upon receiving this response, the BCM may instruct the vehicle 12 to unlock the vehicle door (s) and/or start the vehicle motor. In other PKES systems, the beacon signal of the VT may only be a wake-up signal. When the keyfob receives the wake-up signal, it may demodulate the wake-up signal, interpret it, compute, and transmit an acknowledge signal. Then, once the VT receives the acknowledge signal, the VT may transmit another beacon signal having the vehicle ID and/or challenge signal to test the KT's response. In still other PKES systems 48, the vehicle doors will not unlock nor will the vehicle start without an additional vehicle user action. For example, the VT may not transmit any beacon signal until the user actuates the vehicle door handle. Only then may the VT and KT wirelessly communicate. Similarly, the keyless start functionality may require additional vehicle user action: e.g., the VT may not transmit any beacon signal until the keyfob enters the vehicle (determined, e.g., using the keyfob locators); the user actuates the vehicle start button; the user depresses the vehicle brake pedal; and/or the user performs some other operation associated with entry to the vehicle 12.

It should be appreciated that all communications between the VT and the KT may occur within the proximity preselected by the manufacturer and thus may be limited by design. For example, it may be desirable in PKES systems not requiring vehicle user action for the proximity to be approximately 100 meters. Or for example it may be desirable in PKES systems using one or more vehicle user actions for the proximity to be only 1-2 meters. Moreover, the range of the proximity may vary depending on system characteristics such as power of the transceivers, hardware implementation, filtering design at the transceivers, the medium of transmission, the path of transmission (e.g., where the path is uninhibited or comprised of obstacles), and any noise internal to the devices or environmental noise (i.e., noise within the medium of transmission).

In addition, all transmissions between the VT and KT may be encrypted to further enhance security. Cryptography may include Advanced Encryption Standard (AES), a symmetric cryptographic algorithm, or Rivest, Shamir and Adleman (RSA), an asymmetric (or public key) cryptographic algorithm.

Method

Figure 4:
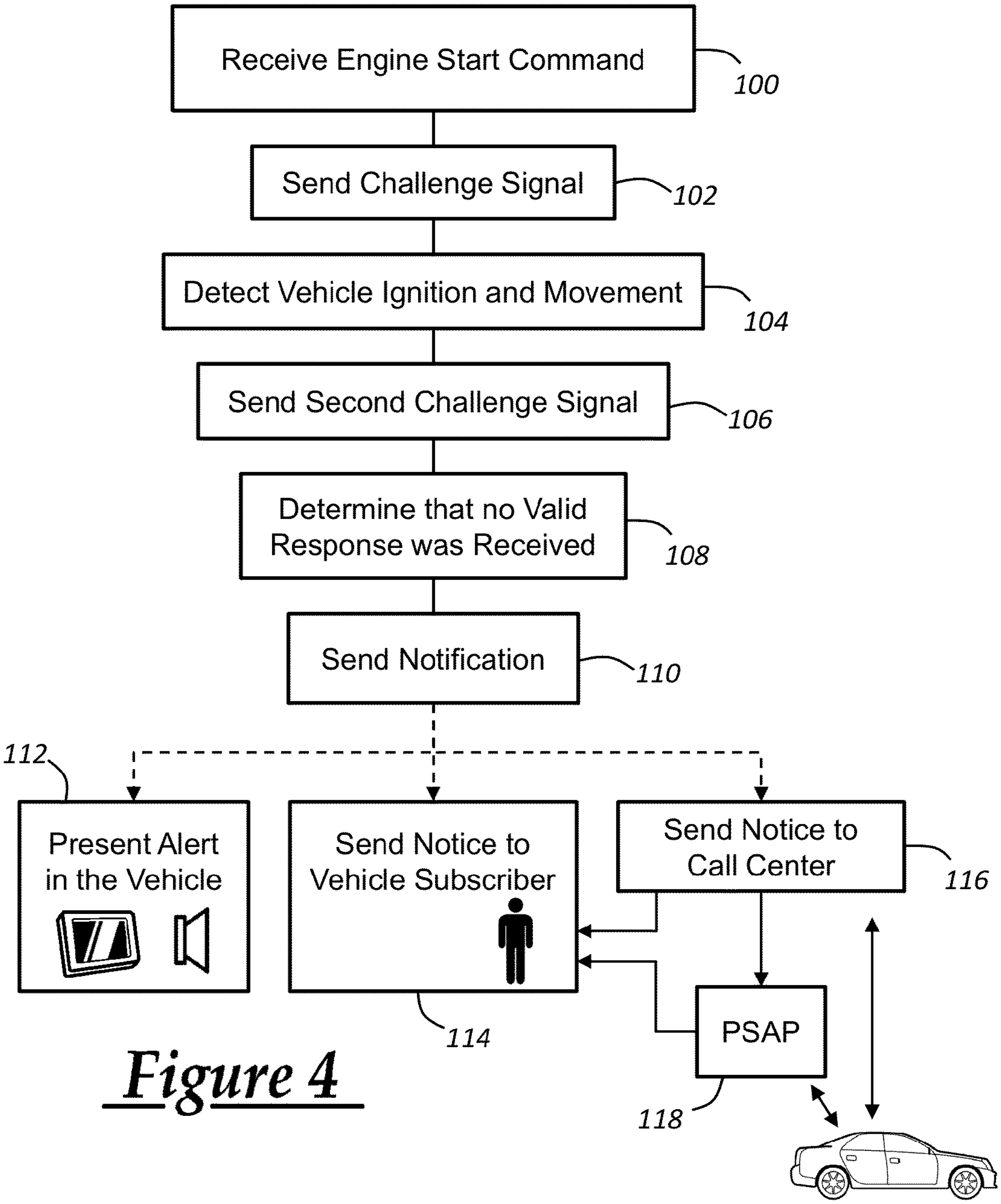
FIG. 4 is a flowchart illustrating an exemplary method of notification that a keyfob of a vehicle is not within the vehicle after the vehicle motor has been started using a passive keyless start (PKS) system.

FIG. 4 illustrates one method of implementing the present disclosure. It shows a method of providing notification for a vehicle having a passive keyless (PK) system that includes a vehicle transceiver (VT) carried by the vehicle and a portable keyfob having a keyfob transceiver (KT). The method may detect the occurrence of a relay attack. In addition, it may detect instances where the vehicle user, after having started the vehicle 12 using the PK system, departs with the vehicle and inadvertently leaves behind the vehicle keyfob.

In step 100, the vehicle receives a command to start the engine. As previously discussed, the start engine command may be sent passively by the KT to the VT. In one implementation, the VT may first transmit a beacon signal that wakes up the KT when it receives the VT beacon signal. After it wakes up, the KT may then send the command to the start engine.

Regardless, once the vehicle receives the command to start the engine, the VT may send a challenge or query signal to the KT (step 102).

Upon receiving the challenge signal (step 102), the KT may then transmit an accurate or valid response signal which may result in the engine starting. However, where the VT fails to receive an accurate response or simply receives no response, the engine may not start. In one implementation, the motor of the vehicle may only start if one or more vehicle entrance indicators are detected after the occurrence of the challenge signal and/or its accompanying accurate response (i.e., keyfob presence validation). In another implementation, the vehicle may not start unless the entrance indicators are detected within a preselected amount of time of the challenge signal and/or response.

As used herein, vehicle entrance indicators may include one or more user actions; e.g., opening the vehicle door, depressing the brake pedal, actuating the vehicle's start button, engaging the driver's seat belt, etc. These vehicle entrance indicators may be detected by the BCM or other VSM. These vehicle entrance indicators are illustrative and various other entrance indicators and/or combinations, series, or sequences of entrance indicators may be used.

The preselected amount of time may be determined by the manufacturer of the vehicle or the telematics unit or may be defined by the user (e.g., programmable). In one example, the preselected amount of time may be two minutes; i.e., once the VT's challenge signal receives the accurate response from KT, the vehicle may not start unless the brake is depressed within two minutes.

In step 104, the vehicle BCM and/or various VSMs may then detect vehicle ignition and vehicle movement. For example, whether the motor is operative may be determined by the PCM or power control module or other VSM 42 which may determine whether the vehicle's motor is in an ON or OFF state. And the vehicle's movement, for example, may be determined by the GPS 40 or a VSM 42 such as the BCM or body control module. In one implementation, the GPS 40 may determine movement based upon the vehicle's geographical displacement and/or the BCM may detect vehicle movement by detecting vehicle wheel rotation.

Upon receiving indication that both the engine is running and the vehicle is moving, in step 106 a second challenge or query signal may be sent from the VT to the KT, e.g., to determine whether the keyfob is within the vehicle. If the keyfob is within the vehicle, it may respond accurately to the challenge. However, if the keyfob is not within the vehicle, in step 108, the response may not be validated. In some instances, the absence of the keyfob may indicate the possibility of the vehicle's theft using a relay attack. In one implementation, the VT may wait to receive an accurate response to the second challenge from the KT for a predetermined amount of time. If this predetermined amount of time lapses without a response, the response may be determined to be not valid.

When the second challenge is not validated, the vehicle in step 110 may then send one or more notifications (e.g., to the call center 20 or the user or a third party public or private service or any combination of thereof). Notifications sent to the call center 20 may use the telematics unit 30 and the wireless carrier system 14 (step 116). In one embodiment, the vehicle notification may first be received by a Public Safety Answering Point (PSAP; also called a "Public Safety Access Point") (step 118) before being sent or relayed to the call center 20. Both the PSAP and the call center 20 may have the capability to identify the location of the vehicle 12. The notification may be a trouble code known to the call center 20 or a textual message, or take any other suitable form.

When the notification is sent to the vehicle subscriber (step 114), it may be sent directly or indirectly and may also use the telematics unit 30 and the wireless carrier system 14. Direct notifications may include a Short Message Service (SMS) or text message sent via the carrier system 14 to the vehicle user's handheld communication device or HCD (e.g., a cellular telephone, a personal digital assistant (PDA), a Smart Phone, a personal laptop computer having two-way communication capabilities, a netbook computer, etc.). The SMS may state, for example: YOUR VEHICLE IS MOVING WITHOUT THE KEYFOB.

Indirect notification may include notifying the subscriber via the call center 20. The call center 20 (e.g., the live advisor 86) may then contact the vehicle user (e.g., using the vehicle user's HCD or the user's home or work landline). This may permit the call center 20 to determine whether the vehicle subscriber is operating the vehicle without the keyfob or whether the vehicle may be being operated without the vehicle subscriber's authorization.

Both direct and indirect notifications may include using an audible or visual notification utilizing the audio system 36 or vehicle displays 38 (step 112).

While FIG. 4 illustrates one embodiment, other embodiments are also possible. For example, the call center 20 may also further contact emergency services (including law enforcement) regarding the notification (e.g., if it is determined that the vehicle 12 has been stolen). Thus, the call center 20 may further provide information to law enforcement to assist in the vehicle's recovery (e.g., the vehicle's whereabouts using GPS). Direct or indirect communication, and any variations thereof, may be preselected by the manufacturer and/or the vehicle user (e.g., as a preference). In one embodiment, the vehicle user may elect to both receive an SMS notification and have the telematics unit 30 send the notification to the call center 20. The particular selection of notification options may be made available to the user via a telematics subscription account, such as via a web logon that permits subscriber configuration of these and other options.

In another embodiment, the secondary challenge signal may comprise precisely the same information as the original challenge signal used to actuate the vehicle motor (e.g., the vehicle ID and the challenge). In addition, once the vehicle is started (e.g., using PKES), the second challenge signal may be periodically transmitted. And each time it is transmitted, the VT may await the accurate response signal, thus periodically validating that the keyfob is remaining within the vehicle. This may be useful in situations where the PKES system starts the vehicle with the vehicle user inside but later the vehicle user exits the vehicle (perhaps even temporarily) while the vehicle is motor is running and then reenters the vehicle without the keyfob.

In another embodiment, the VSM 42 (e.g. BCM) receiving sensor inputs from the keyfob locators may be used to determine whether the keyfob is being carried by the vehicle but not within the passenger compartment. Furthermore, the vehicle user may be directly or indirectly notified of this determination. For example, where the keyfob presence validation has failed after the vehicle was started using PKES, the VSM 42 may determine based upon sensor input from one or more keyfob locators that the keyfob is being carried by the vehicle, outside of the vehicle, or outside of the vehicle passenger compartment. The vehicle user may be notified using any of the afore-described direct and indirect methods of notification. For example, where the vehicle user receives notification via a HCD, the text message may state: KEYFOB OUTSIDE THE VEHICLE. In addition, the notification may not be sent using the wireless carrier system 14 but delivered to the vehicle user using vehicle electronics 28. For example, the visual display 38 may provide the notification to the vehicle user using a textual or symbolic characterization that the keyfob is outside of the passenger compartment. For example, the textual notification may state: KEYFOB OUTSIDE THE VEHICLE and may be accompanied by an audible or visual alert using the audio system 36 and/or visual display 38. Another example may include the flashing of a picture of a key on the display 38 with or without accompanying text.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing a notification for a vehicle having a passive keyless (PK) system that includes a vehicle transceiver (VT) carried by the vehicle and a portable keyfob, comprising the steps of:

a) sending a vehicle challenge signal from the VT;
b) receiving from the keyfob a valid first response to the vehicle challenge signal;
c) carrying out a vehicle function in response to a command received from the PK system following receipt of the valid first response signal;
d) determining an absence of the keyfob within a vehicle passenger compartment of the vehicle after the vehicle is started; and
e) providing a notification in response to the determination of the keyfob's absence.

2. The method of claim 1 wherein step (d) comprises attempting to validate the presence of the keyfob at the vehicle by sending a secondary challenge signal from the VT and determining that a second valid response was not received at the vehicle.

3. The method of claim 2 wherein the vehicle challenge signal is identical to the secondary challenge signal and the first response signal is identical to the second response signal.

4. The method of claim 1 wherein step (d) comprises detecting, using keyfob locators, that the keyfob is not within the vehicle passenger compartment but is being carried by the vehicle.

5. The method of claim 1 wherein step (e) comprises providing the notification to a call center via a wireless carrier system using a vehicle telematics unit carried by the vehicle.

6. The method of claim 1 wherein step (e) comprises providing the notification to a handheld communications device using SMS via a wireless carrier system using a vehicle telematics unit carried by the vehicle.

7. The method of claim 1 wherein step (e) comprises providing the notification using a visual display within the vehicle passenger compartment.

8. The method of claim 1 wherein step (c) further comprises providing the notification to a call center.

9. The method of claim 1 wherein step (c) further comprises providing the notification to a handheld communications device using SMS.

10. A method of providing a notification following a passive, keyless start of a vehicle when a keyfob for the vehicle is not within a passenger compartment of the vehicle, comprising the steps of:

a) starting a motor of a vehicle using a passive keyless start (PKS) system;
b) determining an absence of the keyfob within a vehicle passenger compartment after the motor is started; and
c) providing a notification in response to the determination of the keyfob's absence from the vehicle via a wireless carrier system using a vehicle telematics unit carried by the vehicle.

11. The method of claim 10 wherein step (a) further comprises starting the motor in response to detecting a combination of vehicle entrance indicators, including:

detecting a depression of the brake pedal of the vehicle; and
detecting the actuation of a push button used to start the vehicle.

12. The method of claim 10 wherein the PKS system comprises a vehicle transceiver (VT) carried by the vehicle and a keyfob having a keyfob transceiver (KT), and wherein step (a) further comprises (a1) detecting a vehicle entrance indicator, (a2) receiving at the VT a valid signal from the KT, and enabling starting of the motor in response to steps (a1) and (a2).

13. The method of claim 12 wherein step (b) comprises attempting to validate the presence of the keyfob by sending a secondary challenge signal from the VT to the KT and not receiving a second accurate response from the KT within a selected amount of time.

14. The method of claim 13 wherein the vehicle challenge signal is identical to the secondary challenge signal and the first response signal is identical to the second response signal.

15. The method of claim 10 further comprising the step of detecting vehicle movement and carrying out step (c) in response to both step (b) and the detection of vehicle movement.

16. The method of claim 15 wherein the detecting step further comprises detecting vehicle movement using at least one vehicle sensor, a GPS receiver, or both.

17. A system of vehicle theft notification, comprising:

a) a passive keyless start (PKS) system of a vehicle, the PKS system comprising:
  1) a vehicle transceiver (VT); and
  2) a vehicle keyfob having a keyfob transceiver (KT); said VT and said KT capable of wirelessly communicating with each other to passively start the vehicle, and wherein the transceivers are capable of wirelessly communicating at least once after the vehicle is started to validate the presence of the keyfob within a passenger compartment of the vehicle;
b) at least one vehicle system module (VSM) able to detect a vehicle sensor input associated with vehicle movement; and c) a vehicle telematics unit (VTU) carried by the vehicle able to wirelessly transmit a notification of the absence of the keyfob from within the vehicle when after the passive keyless start vehicle movement has been detected and there is a failure to validate the presence of the keyfob within the passenger compartment within a selected amount of time.

* * * * *